AHMED EL BINDARI
INVENTOR.
BY Alden D. Redfield
Melvin E. Frederick
ATTORNEYS

AHMED EL BINDARI
INVENTOR.
BY Alden D. Redfield
Melvin E. Frederick
ATTORNEYS

United States Patent Office 3,471,925
Patented Oct. 14, 1969

3,471,925

COMPOSITE SUPERCONDUCTIVE CONDUCTOR AND METHOD OF MANUFACTURE

Ahmed El Bindari, Cambridge, Mass., assignor to Avco Corporation, Cincinnati, Ohio, a corporation of Delaware Filed Nov. 17, 1965, Ser. No. 508,226
Int. Cl. H01s 4/00
U.S. Cl. 29—599 13 Claims

ABSTRACT OF THE DISCLOSURE

A method of manufacturing superconductive conductors from what would otherwise be considered excessively brittle superconductive material such as $Nb_3Sn$ wherein a relatively large core of such brittle superconductive material is disposed in a sleeve of ductile metal to form a composite billet which is then drawn to form a conductor having a cross sectional area substantially less than that of the billet.

This invention relates to composite superconductive conductors and the method of manufacturing same. More particularly, this invention relates to a method of making composite superconductive conductors and the superconductive conductor itself wherein a superconductive core is disposed within a sheath of normal metal.

"Hard" superconductors, such as, for example, $Nb_3Sn$, $Nb_3Sb$, $Nb_3Sn_{0.835}In_{0.165}$, $Nb_3Sn_{0.9}Pb_{0.1}$, $Nb_3Sn_{0.62}Zn_{0.38}$, $Nb_3Al$, $V_3Si$, $V_3Ga$ and the like, find wide use in the production of intense magnetic fields. The advantage of a "hard" superconductor is that it remains superconductive in the presence of intense magnetic fields. By way of example, others have observed superconductivity in $Nb_3Sn$ at average current densities exceeding 100,000 amperes/cm.$^2$ in magnetic fields as large as 88 kilogauss. Whereas $Nb_3Sn$ has a critical temperature of 18.5° K. (it reverts to the normal state if its temperature exceeds 18.5° K.), Nb and Sn both have critical temperatures less than 12° K. Further, whereas both Nb and Sn may be plastically deformed, $Nb_3Sn$ has substantially no plastic deformation characteristics.

The present state of the art includes fabricating wires by techniques such as filling a niobium tube with niobium and aluminum powder, niobium and tin powder, etc., drawing the nobium tube to form the wire and then sintering the wire to form an integral core of superconductive material. Alternatively, vapor-phase reactions on the surface of a wire or substrate have been used. In any case, the resulting wire with the exception of vapor-phase reactions deposited on a flexible substrate and thereafter covered with a thin coat of normal metal (one which does not lose all resistance at the temperature of application) is brittle and difficult to fabricate in extreme lengths without flaws. A single flaw in a resulting winding can destroy the usefulness of the solenoid since, at some low value of current, that portion of the winding will revert to the normal state which is to say become resistive. Resultant $I^2R$ heating will then propagate a thermal wave into the remainder of the solenoid, destroying the device if total energies are sufficiently high.

Prior art efforts to minimize the difficulties presented by the brittleness of superconductive materials, such as $Nb_3Sn$, is discussed in the technical literature in considerable detail as is also the fabrication and characteristics of such materials. See, for example, Physical Review Letters, vol. 6, No. 3, pp. 89–91, Feb. 1, 1961, and Metallurgy of Advanced Electronic Materials published by Interscience Publishers 1963, pp. 3–171.

Briefly, because superconductive materials of the type referred to hereinabove, such as $Nb_3Sn$, are brittle, mixtures of the appropriate powdered metals were packed in relatively large niobium tubes and drawn into wires of the order of 0.020 inch. Continuous lengths of Nb-Sn wire (unreacted wire which is to say wire that does not have an integral superconductive core) as long as 12,000 feet have been produced in this manner. However, because of the brittle nature of these superconductive materials, it was found necessary to avoid bending the wire after the integral core of $Nb_3Sn$ was formed. Accordingly, such Nb-Sn wire and the like must first be wound into a coil and the coil then heat treated to form the superconductive material $Nb_3Sn$ which is the reaction product of the niobium and tin powder.

To facilitate drawing of the niobium-core composite to wire, it has previously been suggested that the composite be placed in either nickel, Monel, or stainless steel tubes at the quarter inch diameter stage of the drawing operation. The use of alloys for sheath material, such as Monel or stainless steel, rather than single-component metal, was found to be preferable because of their higher intrinsic resistivities. While some interfacial alloying between the niobium tube and the sheath material was found to occur during heat treatment of reaction of the wire which is generally carried out at about 1000° C. and which produces the reaction of the nobium and tin powders, it was found that the extent of this interfacial alloying appeared to have no effect on the superconductive properties of the wire. However, it was also found that an $Nb_3Sn$ core in stainless steel rather than in niobium had comparatively poor superconducting properties, presumably because of the contamination resulting from the reaction of the tin with the stainless steel.

Superconducting coils requiring heat treatment in accordance with the above-noted prior art teaching are subject to serious disadvantages. In the first place, such superconducting wire which requires the above-noted heat treatment after a composite billet has been drawn to form wire of the desired diameter, cannot be tested to determine its superconductive characteristics until after the coil has been completed. Obviously, if such wire is inherently defective, this can be determined only at the most inopportune time, i.e., after the expense of fabricating an unsatisfactory coil has been incurred.

Further, coils wound with such wire must be designed and handled with extreme care. By way of example, General Electric Company in its published data (Wire and Cable Application Data, Cryostrand Wire, AD–8, Mar. 23, 1964) states that coils formed of its Nb-Sn wire must be heat treated, that since the $Nb_3Sn$ formed during heat treatment is brittle, serious coil damage may occur if the wire is driven normal without adequate circuit protection and that mechanical shock can cause normalization.

Irrespective of whether the composite superconductive conductors referred to hereinabove are of the type requiring heat treatment or are of the vapor-phased deposited thin film type, they do not lend themselves to manufacturing techniques which eliminate the necessity of means such as protective circuitry to protect the coil in the event it goes normal during use. Thus, as is now well known, if a superconductive magnet coil formed of superconductive wire alone goes normal, the resistance introduced causes the creation of forces and/or the generation of heat that may destroy the coil. Accordingly, protective circuitry may be provided to protect the coil or alternatively, the superconductive material may comprise part of a composite conductor as, for example, by being embedded in a relatively massive ribbon of low resistance normal material. The provision of such a composite conductor permits the elimination of the aforementioned protective circuitry which would otherwise be necessary. For a more complete discussion of suitable protective circuitry, reference is made to U.S. patent application Ser. No. 220,237 filed Aug. 27, 1962, and for a more complete discussion of a suitable composite conductor not requiring protective circuitry, reference is made to U.S. patent application Ser. No. 367,814 filed May 15, 1964.

In accordance with the principles of the present invention, the above-mentioned disadvantages and limitations can be substantially minimized if not completely eliminated while at the same time substantially reducing the cost of manufacturing superconductive coils which do not require special means to protect them in the event that they go normal.

As illustrated and disclosed herein by way of illustration, an improved composite superconductive conductor is provided by disposing an integral core of superconductive material in a sleeve of normal metal to form a relatively short billet and reducing the cross sectional area of the billet as by drawing, rolling, and the like, to form the conductor.

It is a principal object of the present invention to provide improved superconductive conductors and techniques for fabricating such conductors.

Another object of the present invention is to provide a flexible composite superconductive conductor comprising a brittle superconductive material.

Another object of the present invention is to provide a flexible composite superconductive conductor comprising a superconductive compound in direct thermal and electrical contact with a normal metal.

A further object of the present invention is to provide an improved composite superconductive conductor and technique for fabricating such conductors which does not require protective circuitry to protect it when formed into a magnet coil.

A still further object of the present invention is to provide a composite superconductive conductor comprising a brittle superconductive material which does not require heat treatment subsequent to the fabrication of the conductor.

It is a still further object of the present invention to provide a technique of crushing a brittle superconductive material and forming it into a desirable shape having superconducting characteristics such as a flexible superconducting wire.

It is a still further object of the present invention to provide a composite superconductive wire comprising a brittle superconductive core that can be wound on small diameters.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
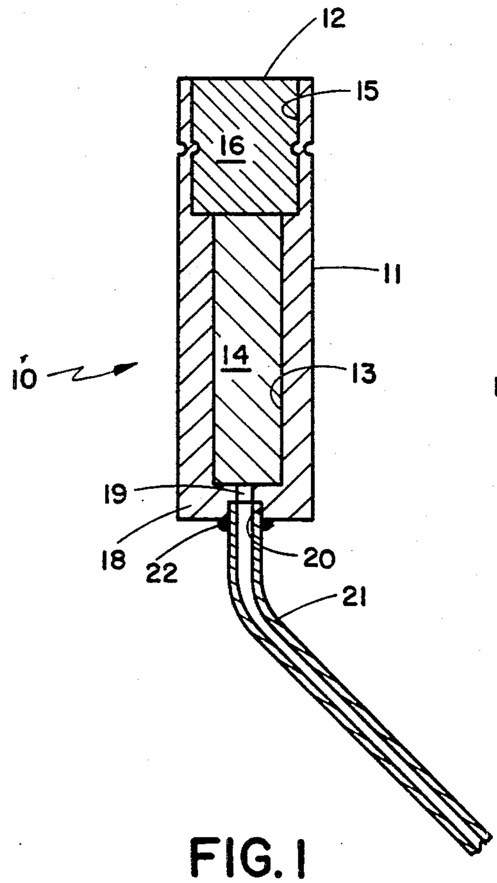
FIGURE 1 is a sectional side view of a cylindrical billet from whch a composite conductor in accordance with the present invention may be fabricated.

Referring now to FIGURE 1, there is shown by way of example a cylindrical billet 10 comprising a hollow cylindrical sleeve 11 of normal metal having good electrical conductivity, such as, for example, copper, aluminum, silver, gold, cadmium and the like. Sleeve 11 is open at one end 12 and has a first axial recess 13 for receiving a core 14 of the superconductive material more fully described hereinafter and a second axial recess 15 adjacent the open end 12 for receiving a metal plug 16.

While not essential to the invention, the axial recess 15 is made larger than the axial recess 13 to prevent the metal plug 16 from bearing on the superconducting core 14. It has been found convenient to stake the plug 16 in its recess 15 to hold it in place during sealing of the open end 12.

Figure 2:
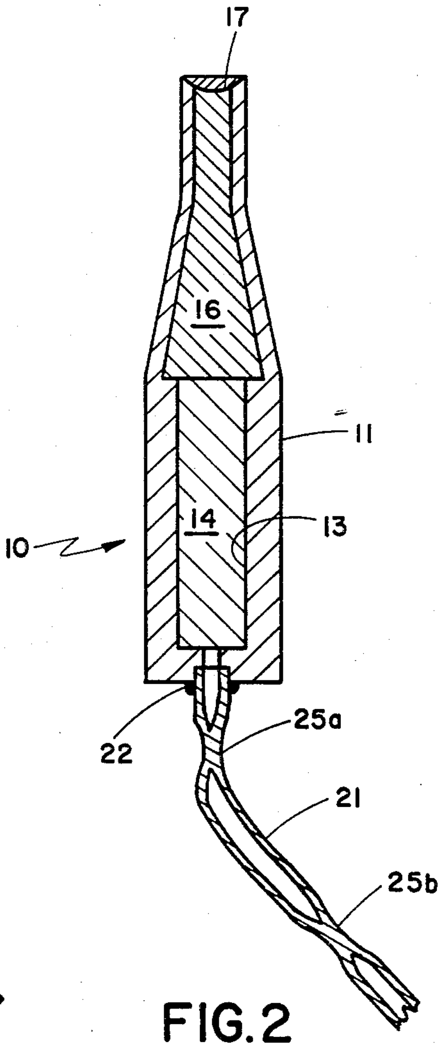
FIGURE 2 is a sectional side view of the billet of FIGURE 1 having the superconductive material sealed therein.

To avoid the application of a substantial amount of heat to the sleeve 11, it has been found convenient to swage the open end 12 of the sleeve as shown in FIGURE 2 to provide a cold weld between the sleeve 11 and the plug 16. If desired, after swaging, the extreme tip 17 of the billet may be sealed with solder.

Returning now to FIGURE 1, the closed end 18 of the sleeve is provided with a small axial passage 19 and a recess 20 to receive a metallic evacuation tube 21. Tube 21 may be soldered to the sleeve as at 22 and after the open end 12 is sealed, connected to an evacuation pump (not shown) and the interior of the sleeve and superconductive core evacuated to about $10^{-3}$ mm. of Hg. After evacuation, the pipe 21 is sealed in any suitable manner as at **25*a* and 25*b*** in FIGURE 2 to maintain the vacuum in the sleeve.

After the billet has been sealed, it is then reduced in cross section as by drawing, rolling and the like, to provide a conductor having the desired diameter such as, for example, .01 inch. The conductor is preferably formed as by rolling in conventional manner to have substantially any cross sectional configuration desired. By way of illustration, a billet as shown in FIGURE 1 sealed and rolled to form a stabilized superconductor (described more fully hereinbelow) had an outer diameter of one inch, a length of two and one-fourth inches, recess 15 had a diameter of three-fourths inch and a length of one inch, and recess 13 had a diameter of one-half inch and a length of two inches. The integral superconductive core 14 was dimensioned to just fit in recess 13.

While the preferred embodiment of the present invention has been described in connection with a low resistance sleeve, it is to be understood that conventional high resistance sleeves such as nickel, Monel, and stainless steel sleeves may be used. The use of high resistance sleeves however, will result in a flexible but unstabilized conductor.

Directing attention now to the superconductive core 14, the core prior to formation of the wire which is to say reduction of the cross sectional area of the billet 10, may, for example, comprise commercially available $Nb_3Sn$, $Nb_3Al$, $V_3Ga$, $V_3Si$ and the like, referred to hereinabove. The core 14 may be the brittle superconductive material formed by the reaction of at least one metal powder such as niobium and another constituent such as, for example, powdered silicon, gallium, tin and the like. While the formation of the superconductive material prior to drawing forms no part of the invention, a brief discussion of the formation of a suitable superconductive material, such as, for example, $Nb_3Sn$, at this point will be helpful.

$Nb_3Sn$ having satisfactory superconductive properties may be formed by mixing 325 mesh commercial niobium and tin powders in the ratio of about eighty atomic percent niobium in the powder to twenty atomic percent tin in the powder to provide 3.9 Nb:Sn. After a thorough mixing, the composite powder may be compacted and then heat treated at about 1000° C. for about 16 hours to form the integral superconductive material $Nb_3Sn$. During heat treatment, the niobium and tin powders react to form $Nb_3Sn$.

At this point, it is significant to note that in the prior art, the composite powder is compacted in the drawing of the wire and the wire which contains a powdered metal core is thereafter heat treated to form the superconductive material $Nb_3Sn$, preferably after the wire has been wound into a coil. However, in accordance with the present invention, the compacting and heat treating is completed before the drawing operation. As used herein, the term "drawing" includes any method of reducing the cross sectional area of the billet as by drawing through a die, rolling, and the like and the term "brittle" means the tendency at room temperature and below to fracture without appreciable deformation.

Figure 3:
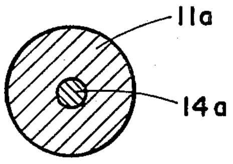
FIGURE 3 is a sectional end view on a greatly enlarged scale of a composite conductor formed from the billet of FIGURE 2.
Figure 5A:
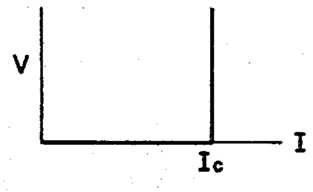
Figure 5B:
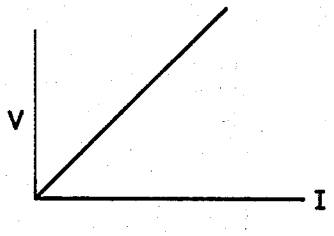
Figure 5C:
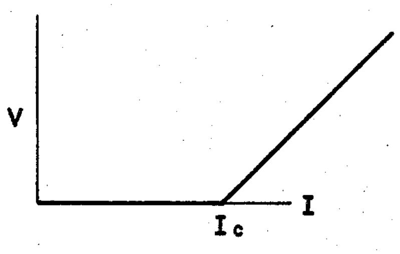
Figure 5D:
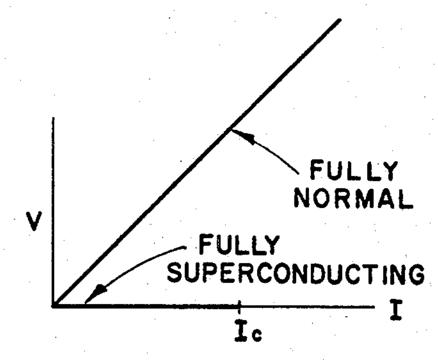

FIGURE 3 shows a sectional end view on a greatly enlarged scale of a wire drawn from the billet 10. The outside diameter of the sheath 11*a* formed from sleeve 11 may, for example, be .01 to .02 inch and the cross sectional area of the superconductive core 14*a* (the core 14 crushed as a result of the reduction in cross sectional area of the billet) may be, for example, about equal to or less than the cross sectional area of the sheath 11*a* after reduction to provide a stabilized superconductor.

Figure 4:
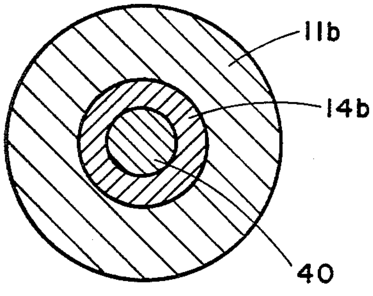
FIGURE 4 is a sectional end view of a modification of a composite conductor fabricated in accordance with the present invention; and FIGURES *5a–d* are graphic illustrations of idealized voltage-current characteristics useful in describing a stabilized superconductor provided in accordance with the present invention.

FIGURE 4 shows a modification on a further enlarged scale to facilitate illustration. As shown in FIGURE 4, the conductor is substantially the same as that shown in FIGURE 3 in that it has an outer sheath 11*b* of normal metal and a superconductive core 14*b*. However, the core 14*b* is annular and surrounds an innermost core 40 of normal metal. The innermost core 40 is provided to reduce the radial thickness of the superconductive material and thereby approximate a thin film superconductor. A conductor constructed in accordance with FIGURE 4 need not be substantially larger than the conductor shown in FIGURE 3. Further, in view of the preceding discussion, it will be readily seen that a conductor similar to that of FIGURE 3 but having a plurality of separate superconductive cores surrounded by normal metal (not shown) may be simply and readily provided if desired merely by providing the necessary number of recesses in the billet.

The basic principle on which the invention is based is that there is no contact resistance between two superconductors if the surfaces of contact are free of foreign elements. Thus, in the present invention, the crushing operation resulting from the drawing of the billet and performed in an inert atmosphere not only provides welded joints between crushed superconductive particles but also provides electrical paths for the current to flow without any resistance. The presence of the sheath of normal material surrounding the superconductive material has two important effects. The first is to provide a mechanical support for the superconductive core and the second is to provide stabilization. As a mechanical support, the sheath provides a means to crush the superconductive material. Further, since the sheath is under stress as a result of the drawing operation, it holds the crushed particles of the superconductive material in intimate contact if they are not cold welded as described above. Removal of the sheath material decreases the current-carrying properties of the superconductive material and can in some instances completely destroy the current-carrying capacity of the superconductive material.

A composite conductor was made according to the invention in the following manner. Niobium powder alloyed with 0.55% zirconium was mixed with tin powder in the proportion of 75 atomic percent niobium and 25 atomic percent tin to form a stoichiometric mixture. The mixture was pressed at about 6000 pounds per square inch and then sintered for one and one-half hours at 1200° C. to form an integral core having an outside diameter of 0.5 inch and a length of 1.5 inches.

The integral core formed in the above-described manner was then sealed in a vacuum of $10^{-3}$ mm. of Hg in a cylindrical copper sleeve having an outside diameter of 1.0 inch and a length of 2.0 inches.

The sealed billet was then rolled to a diameter of about .25 inch and then drawn through dies to a final diameter of .120 inch, the superconductive core at this point having a diameter of .06 inch. This conductor had a critical current of about 750 amperes in a zero magnetic field.

A stabilized superconductor is one which returns to the superconducting state following a disturbance, either self-generated (such as a flux jump) or externally generated (vibration, rapid external field change, temporary excess in current, etc.) without requiring a reduction in excitation current.

The principle of stabilization can be understood by referring to FIGURES *5a, 5b, 5c* and *5d*. FIGURE *5a* shows the idealized voltage-current characteristic of a superconductor which is always maintained at the superconducting bath temperature. FIGURE *5a* assumes that the rate of resistance rise in the critical current $I_c$ is very high. To form a stabilized superconductor, the superconductive material may be placed in good electrical and thermal contact with a substrate whose voltage-current characteristic is that of a simple resistance shown in FIGURE *5b*. The combined voltage-current characteristics of the composite conductor with the restriction that the superconductive material remain always at the bath temperature is shown in FIGURE *5c*.

It will now be seen that there are two limits of operation for such a composite conductor. If sufficient cooling is provided to maintain the superconductive material at the bath temperature, there will be provided the characteristic shown in FIGURE *5c*; if insufficient cooling is provided, there will be provided the characteristic as shown in FIGURE *5d* which is double valued everywhere below the critical current $I_c$, showing that operation is possible only in the fully superconducting or fully normal state.

If the composite conductor is cooled enough, no voltage will appear in the conductor until the critical current $I_c$ has been reached, and above the critical current the voltage will rise gradually with current. Upon lowering the current, the voltage will again disappear at the critical current.

If the composite conductor is not adequately cooled, a different situation exists. Consider first the case of the superconductor that is not subject to instabilities or disturbances. In this case, no voltage appears until the current reaches the critical value. At this point, a sudden voltage will appear with the appearance in the circuit of a sizeable resistance. If the current is now lowered, a voltage persists until a much lower current is reached and the superconductor again becomes superconducting. This current can be referred to as the recovery current, and depends on the degree to which the conductor is cooled. If the conductor is subjected to disturbances or instabilities, then the situation is a little different. The disturbances are a destabilizing effect and at currents which the voltage is double valued (above the recovery current and below the critical current) their magnitude depends on which of the voltage values the coil will operate. However, it takes only one large disturbance to shift the operation from fully superconducting to fully normal.

Broadly, the amount of substrate required in a conductor depends on the degree to which it is cooled, the substrate resistivity in the normal state, and the properties of the superconductor. For no double valued regions, the amount of substrate has to be such that approximately $$\alpha=\frac{I_c^2\rho}{hPA}(T_c-T_b)<1.0$$

where:

$\alpha$—nondimensional design parameter
$I_c$—critical current in amperes at design value of magnetic field
$T_c$—critical temperature in degrees Kelvin at zero current in the superconductor at the design value of magnetic field
$T_b$—bath temperature in degrees Kelvin
$\rho/A$—resistance in ohms per unit length of substrate
$h$—heat transfer coefficient in watts per square centimeters per degree Kelvin from surface of the conductor to liquid helium P—cooled perimeter in centimeters of the conductor cross section It will now be seen that the substrate should be well cooled and have as low a resistivity as possible consistent with ease of providing good electrical and thermal contact between the superconductive material and the substrate. While the actual minimum ratio of cross sectional area of normal metal to superconductvie material necessary to provide a stabilized superconductor has not been finally established (it depends on various interdependent factors), a ratio of four to one of copper and $Nb_3Sn$ has been found to provide a stabilized conductor and it is believed that this ratio may well be further reduced.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. In the method of forming an elongated electrical conductor comprising a core of superconductive material disposed in a sheath of normal metal, the steps of:

(a) disposing an integral core of superconductive material having substantially no plastic deformation characteristics in a sleeve of normal metal to form a relatively short billet; and (b) drawing said billet to form said conductor having a cross sectional area substantially less than that of said billet wherein during said drawing operation said integral core is crushed and forms within said sheath a large number of superconductive particles in intimate contact one with another.

2. The method as defined in claim 1 wherein said core is sealed in said sleeve in an atmosphere at least substantially inert with respect to said superconductive material.

3. The method as defined in claim 1 wherein said sleeve is evacuated and said core is thereafter sealed in said sleeve.

4. The method as defined in claim 1 wherein the cross sectional area of said normal material is at least about equal to that of said superconductive material.

5. The method as defined in claim 1 wherein the cross sectional area of said normal material is at least about four times that of said superconductive material.

6. The method as defined in claim 1 wherein the superconductive material is substantially $Nb_3Sn$ and the resistivity of said normal metal at room temperature is not substantially greater than that of aluminum at room temperature.

7. The method as defined in claim 1 wherein the superconductive material is substantially $Nb_3Al$ and the resistivity of said normal metal at room temperature is not substantially greater than that of aluminum at room temperature.

8. The method as defined in claim 1 wherein the superconductive material is substantially $V_3Si$ and the resistivity of said normal metal at room temperature is not substantially greater than that of aluminum at room temperature.

9. In the method of forming an elongated composite superconductive conductor comprising a continuous sheath of normal metal surrounding an inner core of superconductive material comprising the brittle reaction product of at least two powdered metals, the steps of:

(a) disposing an integral core of superconductive material in an imperforate sleeve of normal metal to form a relatively short billet, said core having a cross sectional area substantially greater than that of said conductor and being brittle to the extent that it is incapable of being cold drawn without fracturing;

(b) sealing said core in said sleeve in an atmosphere at least substantially inert with respect to said superconductive material; and (c) reducing the cross sectional area of said billet to form said conductor having a cross sectional area substantially less than that of said billet wherein during said drawing operation said integral core is crushed and forms within said sheath a large number of superconductive particles in intimate contact one with another.

10. The method as defined in claim 9 wherein said sleeve has a resistivity at room temperature not substantially greater than that of aluminum at room temperature and after said reduction in cross sectional area, said sleeve has a cross sectional area at least about four times that of said superconductive material.

11. The method as defined in claim 10 wherein said superconductive material is substantially $Nb_3Sn$.

12. The method as defined in claim 10 wherein said superconductive material is substantially $Nb_3Al$.

13. The method as defined in claim 10 wherein said superconductive material is substantially $V_3Si$.

References Cited

UNITED STATES PATENTS

| | | | |
|---|---|---|---|
| 3,084,041 | 4/1963 | Zegler et al. | |
| 3,109,963 | 11/1963 | Geballe. | |
| 3,131,469 | 5/1964 | Glaze. | |
| 3,204,326 | 9/1965 | Granitas. | |
| 3,218,693 | 11/1965 | Allen et al. | 29—599 |
| 3,239,919 | 3/1966 | Levi | 29—599 |
| 3,243,871 | 4/1966 | Saur | 29—599 |
| 3,277,564 | 10/1966 | Webber et al. | 29—599 |
| 3,162,943 | 12/1964 | Wong | 29—599 |
| 3,325,888 | 6/1967 | Weinig et al. | 29—599 |
| 3,370,347 | 2/1968 | Garwin et al. | 29—599 |
| 3,378,916 | 4/1968 | Robinson et al. | 29—599 |

OTHER REFERENCES

IBM Technical Disclosure Bulletin, vol. 5 No. 7, December 1962, pp. 5 and 6 by Reich.

PAUL M. COHEN, Primary Examiner